April 17, 1928. 1,666,271
A. SPIELMAN
CUTTING MACHINE
Filed Dec. 13, 1923 3 Sheets-Sheet 1
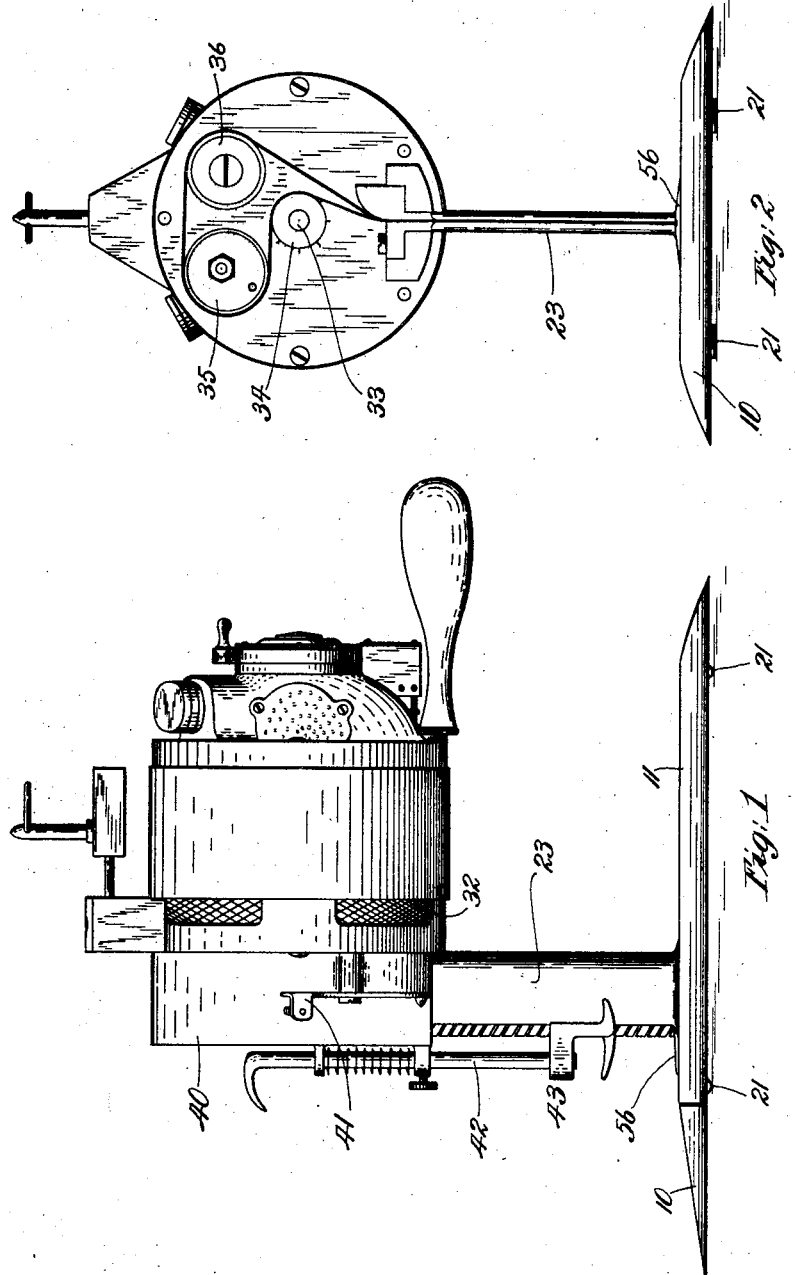
WITNESSES:
INVENTOR.
Adolph Spielman.
BY
ATTORNEY.

April 17, 1928.

A. SPIELMAN 1,666,271

CUTTING MACHINE

Filed Dec. 13, 1923

3 Sheets-Sheet 2

WITNESSES:

INVENTOR.
Adolph Spielman,
BY
ATTORNEY.

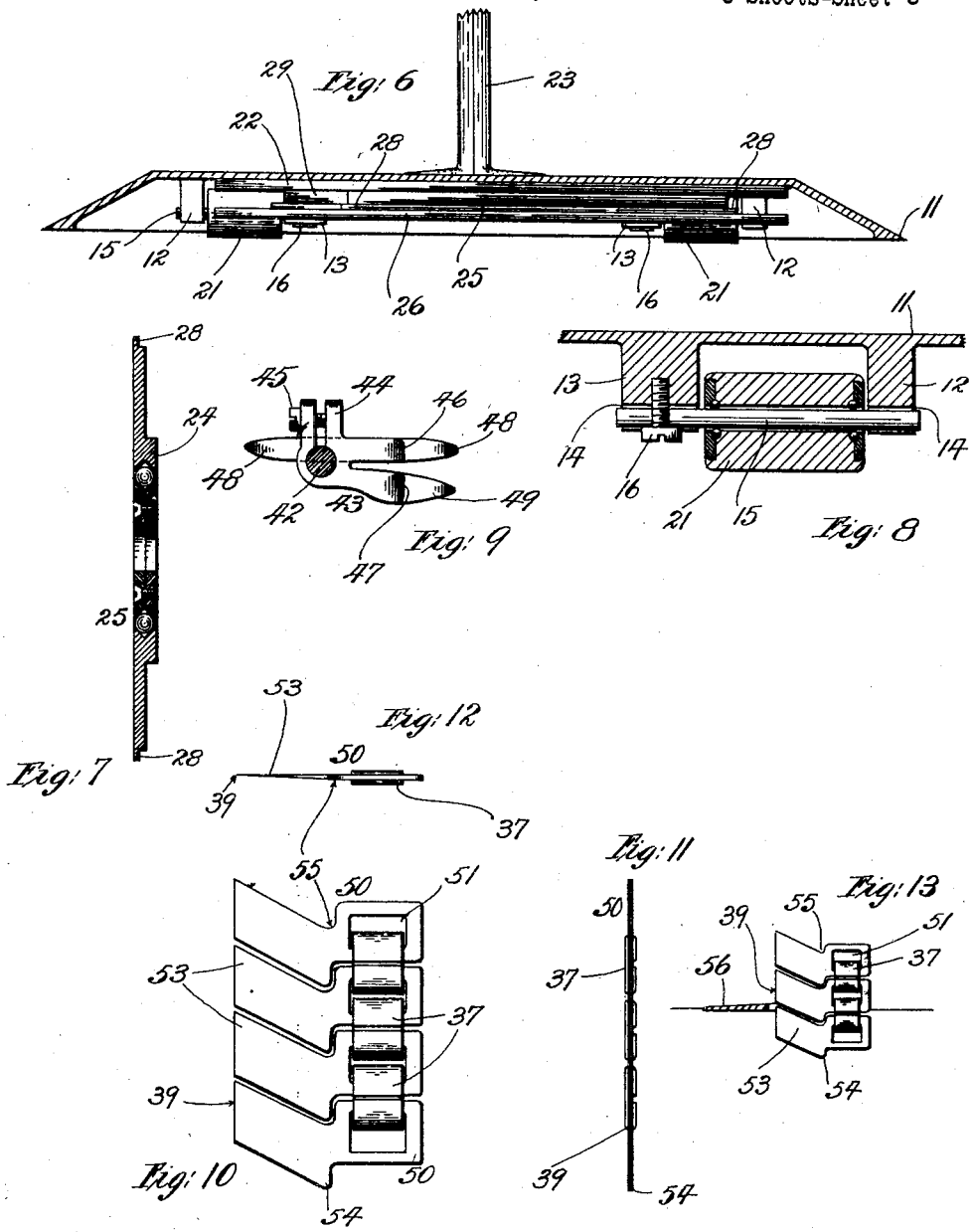

Patented Apr. 17, 1928.

1,666,271

UNITED STATES PATENT OFFICE.

ADOLPH SPIELMAN, OF PHILADELPHIA, PENNSYLVANIA.

CUTTING MACHINE.

Application filed December 13, 1923. Serial No. 680,481.

This invention has relation to cutting machines and has more particular relation to improvements upon the cloth cutting machines described in Letters Patent granted to me under date of July 7, 1908, numbered 892,462, and under date of January 14, 1913, and numbered 1,050,307.

The principal object of the present invention may be said to reside in an arrangement, construction and combination of parts, whereby strain and friction upon the endless cutting band is reduced to a minimum as compared to the strain and friction to which the cutting band is subjected in accordance with the construction disclosed in my aforesaid patents. A further object of the present invention resides in the providing of an exceedingly low base for the cutting machine in order that goods may be fed to the endless cutting band in as near a horizontal position as possible in order that the top and bottom layers of the goods may be cut uniformly. A still further object of the present invention resides in the providing of a new and novel shape of cutting knives for the endless cutting band wherein the forward portions of the knives have nested relation one with another so that relatively little space is present between adjacent knives thus preventing to a degree the possibility of goods being dragged between the individual knives with a consequent breakage of the cutting band. A still further object of the present invention resides in the providing of a cutting machine, the parts of which are arranged so that to a degree the machine is self-cleaning of lint and other material caused by the cutting operation of the machine.

Other and further objects of the invention reside in the providing of certain new and novel features of construction and combinations of parts as will hereinafter more fully appear. With these and other objects in view, the invention consists of the improvements hereinafter described and finally claimed.

Figure 3:
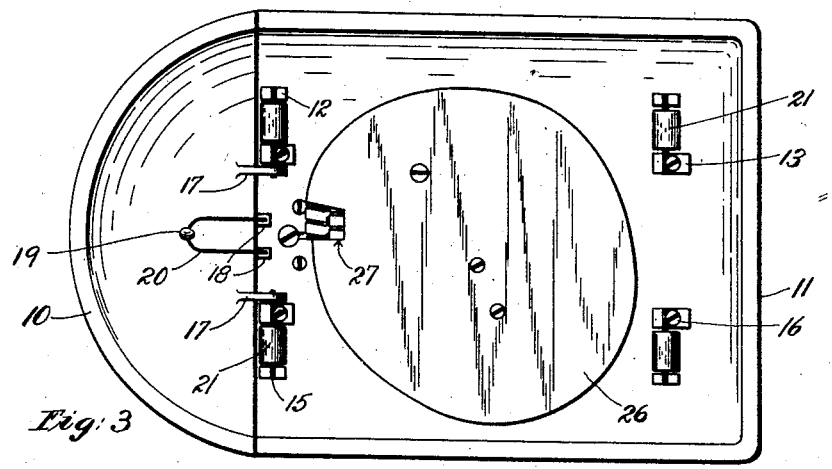
Figure 4:
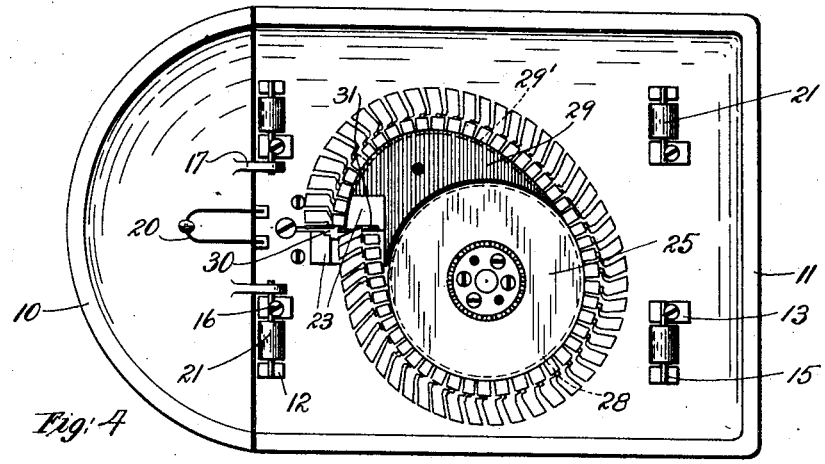
Figure 5:
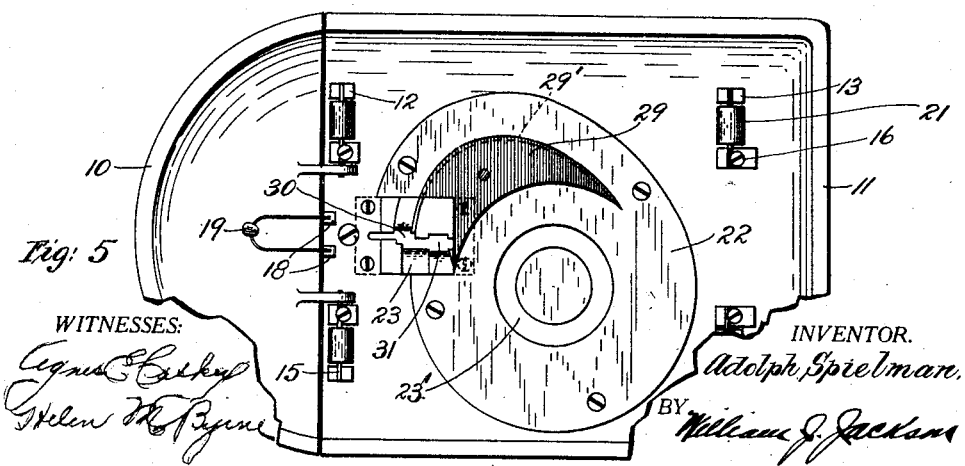

The nature, characteristic features and scope of the invention will be more fully understood from the following description taken in connection with the accompanying drawings forming part hereof and in which:

Fig. 1 is a view in side elevation of a machine embodying the invention,

Fig. 2 is a front view thereof, the removable front casing and its complemental presser foot, being omitted, Fig. 3 is a view in plan of the underside of the base plate of the machine, Fig. 4 is a similar view, with the protective plate removed to show the endless cutting band, Fig. 5 is a similar view, the cutting band being omitted to illustrate details of construction, Fig. 6 is a view in cross section drawn to an enlarged scale, of the base plate, Fig. 7 is a view in section of the ball bearing knife guide, Fig. 8 is a fragmentary view in section of one of the ball bearing rollers for the machine base, Fig. 9 is a plan view of the presser foot, Fig. 10 is a fragmentary view in side elevation of the endless cutting band, Fig. 11 is an edge view thereof, Fig. 12 is a top view of Fig. 10, and Fig. 13, is a fragmentary view in section, illustrating a detail of construction hereinafter referred to.

Referring to the drawings the improved cutting machine is provided with a base plate of generally rectangular form provided with walls which incline in order to permit the base being readily slipped beneath material to be cut. The base plate of the present machine is constructed very low in order that layers of material may be fed to the cutting band of the machine in as near a horizontal position as possible in order that the top and bottom layers may be uniformly cut. This low construction of base is made possible by reason of improvements to be presently described. The base plate is made up of two sections 10, and 11, the former having hinged relation with the latter as will presently appear. Formed integral with the section 10, of the base approximately near each corner thereof, are lugs 12, and 13, the undersides of which are slotted as at 14, see Fig. 8. Accommodated by the slotted parts of each set of lugs is a spindle 15, secured as by a screw 16, to the lug 13, which is slightly larger than the lug 12. The spindles adjacent the hinged section 10, are slightly longer than the others and are engaged by lugs 17, fixed to the section 10, see Fig. 3. This forms a simple and inexpensive hinged connection. Interposed between lugs 18, on the section 11, and a lug 19, on the section 10, is a wire spring connection 20, for supporting in a relatively yielding position, the forward section 10. Upon the spindles 15, between each pair of lugs 12, and 13, is arranged a ball bearing roller 21, in order to permit the machine to be readily moved over a table or the like in use. As clearly shown the underside of the base plate is dished out to house the above described parts as well as those now about to be described. Fixed to the underside of the section 11, of the base plate, is a thin flat bearing plate 22, see Fig. 5, of hardened steel, the same being substantially egg-shaped peripherally with a portion thereof cut away to expose the bottom of the vertical standard 23, to be presently described. That portion of the plate 22, which is generally rounded, peripherally considered, has a counter-sunk portion 23', of circular contour, which receives the flanged portion 24, of a ball-bearing idler 25, see Fig. 7. A part of this idler 25, is free to rotate between the bearing plate 22, and the cover plate 26, see Fig. 3, which plate is suitably secured by screws as shown and is provided with an opening 27, to permit lint and the like, carried by the endless band, to drop therethrough. In practice, the idler 25, is very thin, as are the plates 22, and 26, and are assembled in a plane paralleling the top of the section 11, and are wholly contained within said section. The rotatable part of the idler 25, is provided with a peripherally flanged portion 28, adapted to maintain in proper position the bight of the endless cutting band as it passes therearound. Fixed to the bearing plate 22, is a cam 29, the inner edge of which is closely adjacent the periphery of the idler 25, and is cut away to register with the opening 27, in the cover plate 26. The cam is also flanged as at 29'. The flanged portions 28, and 29', form a continuous bearing surface for the endless cutting band. In operation the endless cutting band descends with the knives thereof in edgewise position through the channel 30, of the standard 23, see Figs. 4, and 5, then passes around the cam 29, with the knives in flatwise position, said cam being shaped and proportioned to guide the band to the circular idler 25. The idler in turn guides the knives to the channel 31, of the standard whereupon the knives assume an edgewise position and pass up through the standard with their cutting edges wholly within the standard. The standard 23, carries at its top the motor 32, armature shaft 33, of which has fixed thereto a main driving wheel 34. This wheel is peripherally provided with teeth for meshing with and exerting an upward pull upon the endless cutting band to be presently described. Idler sheaves 35, and 36, are also present adjacent the wheel 34, of which the sheave 35, is eccentrically arranged for adjusting the tension of the endless band.

The endless cutting band is made up of a multiplicity of knives detachably interlocked one with another to form an endless band of linked cutters having a continuous cutting edge and calculated to have its opposite sides or runs to travel endwise in reverse vertical directions at point of presentation of work to be done, the cutting edge of one of said sides or runs being to the rear of and out of alignment with the other of said sides or runs as hereinbefore mentioned. At points above and below the standard 23, the knives or cutters of the bights of the endless cutting band travel horizontally upon their flat faces. The endless cutting band consequently is constructed so that there is enough play between its component parts to insure the band being flexible in two planes. Practice has demonstrated that best results are obtainable by constructing the knives so that they have nested relation with one another, see Fig. 10. Each knife 50, is of very thin, relatively flat metal, the rear portion of which is rectangular and is apertured as at 51, which aperture is likewise rectangular in shape. This rectangular portion of the knife terminates in a blade or cutter 53, which is disposed at an angle to the other part, the juncture points forming knobs or humps 54, and depressions or recesses 55. When adjacent blades or cutters are linked together by means of the split rings or links 37, the knobs 54, of one blade or cutter is accommodated by the recessed portion 55, of the adjacent blade so that the knives in assembled position have nested relation with one another and adjacent portions of blades lie very close together. This is important for the reason that for instance when the outermost run of the cutting band is passing through the throat plate 56, of the machine, see Fig. 13, the lower non-cutting part of each knife passes entirely down through the throat plate before the cutting edge 39, thereof reaches a layer of material presented to be cut. Thus the layer of material to be cut cannot be dragged between adjacent knives with consequent breakage of cutting band parts as was formerly the case when the knife blades were widely separated and straight in contra-distinction to being angular. The upper bight of the endless cutting band passes over the wheel 34, and idlers 35, and 36, and the lower bight passes around the cam 29, and ball bearing idler 25, as before mentioned. It may be remarked at this time that to properly accomplish the shifting of the endless band it is essential to reduce strain and friction upon the band parts as much as possible. This is accomplished by the particular arrangement and construction of ball bearing idler and cam below the standard and the drive wheel and idler sheaves above the standard, it being understood in this connection that the teeth of the drive wheel mesh with the apertured portions of the knives and exert an upward pull thereon. In connection with the above described endless band it may also be here mentioned that because of the split rings or links it is possible to readily remove and insert a new blade or cutter at any time which is advantageous. For the purpose of repairing the endless band, cleaning the same or for inspection purposes, it is essential that access thereto may be accomplished readily. Because the base of the machine is free of all obstructions except the rollers and connections and because of the removable cover plate 26, access to the chain or band may be easily had at the machine base, see Fig. 4. Also because of the casing 40, which is removably secured to the frame of the motor 32, by spring detents 41, access may be readily had to the band or chain parts above the standard 23, see Fig. 2. Before leaving the description of the endless band of cutters, it may be mentioned that the knives thereof in their travel down through the channel 30, of the standard serve to clear the same of lint and the like and a great portion of such waste material is eliminated through the aperture 27, in the cover plate 26. Whatever particles of waste which may cling to the knives however are thrown off as the knives spread out fan-fashion in rounding the cam and idler 25, at great velocity. As before stated the base is free of obstructions and this thrown off waste does not clog any machine parts. As the endless band of cutters travels at great velocity and the knives are exceedingly sharp it is necessary to guard the hands of the operator as much as possible. In the present instance the presser foot has been constructed to assist in this respect. Carried by the removable cover 40, is a vertically movable stem 42, equipped with a presser foot 43, see Figs. 1, and 9. This presser foot embraces a bifurcated socket 44, for engaging the stem bottom and is secured thereto by a clamp-screw 45. The socket 44, of the presser foot which is horizontally disposed, is provided with a depending portion split to form legs 46, and 47, which terminate in feet 48, and 49, of which the former extends forwardly and rearwardly from the leg 46, and of which the latter extends rearwardly from the leg 47. The legs 46, and 47, straddle the knives of the endless cutting band as clearly shown in Fig. 11, thus protecting the hands of the operator as will be readily apparent. The feet 48, and 49, straddle the standard. The short foot 49, at the right hand side of the machine serves to permit the operator to clearly see the indicating mark upon the goods being cut so that sharp angles, curves and the like may be readily followed.

By the above described arrangement, combination and construction of parts the following distinct advantages may be mentioned, to wit: First, strain and friction upon the cutting band or chain is reduced to a minimum because of the large diameter of combined cam and ball-bearing idler in the machine base due to the fact that the individual knives in great numbers at one time pass therearound in a plane paralleling the plane of the base top; second, the heighth of the base plate by reason of the above construction may be made very low; third, the knives serve to clear the machine of lint and like waste material, prevent material being dragged between the knife parts and are calculated to give a better cut than heretofore; and fourth, the presser foot is designed to afford protection to the hands of the operator and is designed to give the operator a clear view of the goods being cut. The cutting band or chain possesses the further advantage of being capable for use in connection with cutting machines, sewing machines and various other machines wherein it is desirable to sever materials of various kinds.

It is thought from the above description when taken in connection with my aforesaid patents, that further description of the mode of operation of the present machine is unnecessary.

What I claim is:

1. In a machine of the class described the combination of a base plate, a channeled standard, a driving wheel and idlers operatively mounted above the standard, an idler of relatively large diameter the faces of which are disposed in a plane paralleling the base plate, an endless cutting band or chain having a continuous cutting edge adapted to pass down through the standard with its cutting edge exposed in vertical position, thence around the idler below the standard with its cutting edge in horizontal position and thence upward through standard with its cutting edge hidden and in vertical position and around said driving wheel and idlers above the standard with the cutting edge in horizontal position, and means for shifting the cutting band runs out of alignment.

2. In a machine of the class described the combination of a base plate, a channeled standard, a driving wheel and idlers above the standard, a ball-bearing idler of relatively large diameter the faces of which are disposed in a plane paralleling the base plate, a cam immediately adjacent said idler, also in a plane paralleling the base plate and an endless cutting band having a continuous cutting edge operatively mounted so that its bights travel over said driving wheel, idlers and cam in flatwise position and the runs thereof pass through said standard in vertical position one run being out of alignment with the other.

3. In a machine of the class described the combination of a base plate, a channeled standard, a toothed driving wheel and idlers operative above the standard, a disc-like ball bearing flanged idler of relatively large diameter the faces of which are arranged in parallelism with the base plate top, a flanged cam fixed immediately adjacent said idler, said idler and cam being disposed between bearing and cover plates and an endless chain of interlinked cutting blades operatively mounted so that its bights travel flatwise over said driving wheel, idlers and cam and edgewise through the standard one run thereof being out of alignment with the other.

4. In a machine for cutting or trimming materials of various kinds, a cutter embracing an endless chain of interchangeable knives the blades of which have nested relation and the bights of which are calculated for travel flatwise and the blades of the runs of which are calculated for travel edgewise, each knife comprising a thin flat member apertured at one end and terminating at its other end in a blade disposed at an angle thereto, and links between adjacent knives.

5. In a machine for cutting or trimming materials of various kinds, a cutter embracing an endless chain of interchangeable knives the blades of which have nested relation, the knives of the bights of which chain are calculated for travel flatwise and the knives of the runs of which are calculated for travel edgewise, each knife comprising a thin flat member apertured at one end and terminating at its opposite end in a blade disposed at an upwardly extended angular position, the juncture points forming a recessed portion and a hump like portion, and links between adjacent knives.

6. A cutting tool of the class described embracing a thin flat member one end of which is of rectangular shape and is apertured and the opposite end of which terminates in an integral blade disposed at an angle to said rectangular part the juncture points forming a top recessed portion and a humped bottom portion.

7. In a machine of the class described, the combination of a standard, an endless band having a continuous cutting edge operative for having one of its runs extended forward through said standard, said endless band comprising a plurality of interchangeable knives the blades of which have nested relation and the bights of which travel flatwise, a presser foot operatively mounted with respect to the standard, said presser foot embracing a socket provided with a bifurcated vertical leg portion terminating in spaced, rearwardly extended feet which straddle the standard front, said vertical portion of the socket covering an appreciable portion of the cutting band edge.

8. In a machine of the class described a base plate having forward and rearward sections, lugs formed integral with and depending from the rear section which lugs are arranged in pairs with spindles for said lugs, means including vertical screws for securing each spindle to the innermost of said lugs, other lugs formed integral with the forward sections and engaging said spindles adjacent those lugs engaged by said screws, said spindle arrangement being adapted to form a hinged connection and resilient means between the two sections for supporting the front section in a yielding position.

9. In a machine of the class described the combination of a base plate having formed integral therewith depending lugs arranged in pairs and each having a slotted bottom, a horizontal spindle fitted to each pair of lugs, a vertically arranged screw for securing each spindle to a lug, a channeled standard, a driving wheel and idlers above the standard, a ball-bearing idler of relatively large diameter the faces of which are disposed in a plane paralleling the base plate, a cam immediately adjacent said idler, also in a plane paralleling the base plate and an endless cutting band having a continuous cutting edge operatively mounted so that its bights travel over said driving wheel, idlers and cam in flatwise positions and the runs thereof pass through said standard in vertical position one run being out of alignment with the other.

10. In a machine of the class described the combination of a base plate having formed integral therewith depending lugs arranged in pairs and each having a slotted bottom, a horizontal spindle fitted to each pair of lugs, a vertically arranged screw for securing each spindle to a lug, a channeled standard, a driving wheel and idlers above the standard, a ball-bearing idler of relatively large diameter the faces of which are disposed in a plane paralleling the base plate, a cam immediately adjacent said idler, also in a plane paralleling the base plate and an endless cutting band having a continuous cutting edge operatively mounted so that its bights travel over said driving wheel, idlers and cam in flatwise position and the runs thereof pass through said standard in vertical position, one run being out of alignment with the other, a roller mounted upon such spindle and having ball-bearing relation therewith.

In testimony whereof, I have hereunto signed my name.

ADOLPH SPIELMAN.